Figure 1:
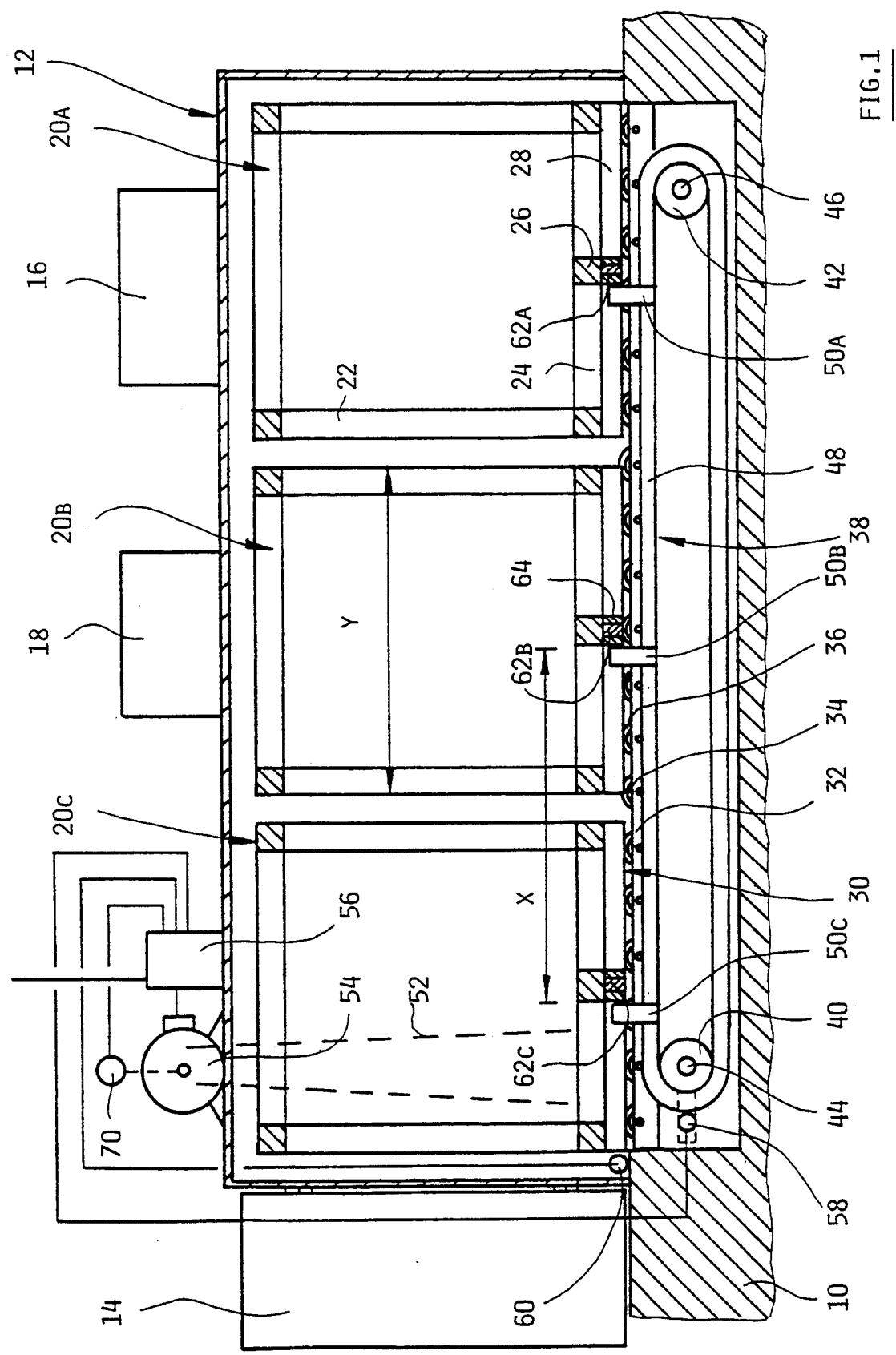

United States Patent [19]
Fessmann

[11] Patent Number: 5,339,727
[45] Date of Patent: Aug. 23, 1994

[54] PRODUCT PROCESSING SYSTEM

[75] Inventor: Klaus-Dieter Fessmann, Winnenden, Fed. Rep. of Germany

[73] Assignee: GFRMOS-Fessmann GmbH & Co KG, Remshalden-Grunbach, Fed. Rep. of Germany

[21] Appl. No.: 933,214

[22] Filed: Aug. 21, 1992

[30] Foreign Application Priority Data

Aug. 30, 1991 [DE] Fed. Rep. of Germany ....... 4128890

[51] Int. Cl.5 .................................. A23B 4/044
[52] U.S. Cl. ................................ 99/482; 99/362; 99/477
[58] Field of Search .............. 99/482, 443 C, 360, 99/362, 373, 386, 423, 477; 198/721

[56] References Cited

U.S. PATENT DOCUMENTS

| 2,070,043 | 2/1937 | Cutler | 198/721 |
|---|---|---|---|
| 2,369,274 | 2/1945 | Beatty | 99/423 |
| 3,129,823 | 4/1964 | Bilocq | 198/721 |
| 3,486,548 | 12/1969 | Todd | 99/423 |
| 3,697,725 | 10/1972 | Bielefeldt | 99/443 C |
| 3,802,832 | 4/1974 | Nicolaus | 99/443 C |
| 4,023,672 | 5/1977 | Haley | 198/721 |
| 4,175,484 | 11/1979 | Tobey | 99/482 |
| 4,644,857 | 2/1987 | Buller-Colthurst | 99/443 C |
| 4,732,265 | 3/1988 | vom Stein | 198/721 |
| 5,052,546 | 10/1991 | Langen et al. | 198/721 |
| 5,197,375 | 3/1993 | Rosenbrock et al. | 99/443 C |

FOREIGN PATENT DOCUMENTS

| 3330620 | 3/1985 | Fed. Rep. of Germany . | |
| 3819889 | 12/1988 | Fed. Rep. of Germany . | |
| 0474680 | 12/1914 | France | 99/423 |
| 0316619 | 8/1930 | United Kingdom | 99/423 |
| 0584767 | 1/1947 | United Kingdom | 99/423 |

Primary Examiner—Timothy F. Simone
Assistant Examiner—James F. Hook
Attorney, Agent, or Firm—Fred Philpitt

[57] ABSTRACT

A system for the processing of products, in particular for smoking and refrigeration of cold meats and sausages, based on stillages (20) with two parallel skids (28) at the bottom. The stillages (20) are moved outside the processing compartment (12) by a floor conveyor such as a lifting truck (66) running on roller tracks (30) arranged on either side of the processing compartment. A chain conveyor (38) including drive dogs (50), actuating driven dogs (62) suspended from the bottom of the stillages (20) to move the stillages (20) intermittently into and out of the processing compartment (12).

12 Claims, 4 Drawing Sheets

PRODUCT PROCESSING SYSTEM

The invention refers to a system for the processing of products, in particular food products.

Typical processing systems of this type are for instance systems for the smoking of bacon, sausages etc. Some of such known systems are using stillages on wheels. As the stillages are very heavy in operation (loaded by up to 1000 kg), they are hard to move. If stillages on wheels and tracks are used, the entire factory installation is to be equipped with tracks, resulting in an inflexible conversion of the manufacturing system.

In addition stillages with wheels have the disadvantage that no threshold can be arranged within the door area of the processing compartment, although this would be of advantage in view of tight sealing of the processing compartment. Furthermore stillages on wheels have the advantage that additional brake systems must be included for parking the stillages safely on surfaces which are not quite level. However, even in the case of stillages equipped with brakes, release of the brake by tampering is possible.

The present invention is therefore the development of a system as described hereinafter, for flexible adaption to various conveying routes, facilitating at the same time the safe and reliable movement of stillages arranged behind each other in the small processing compartment.

In the system of the invention the stillages have skids on either side. Therefore the heavy stillages, when positioned on the floor of a bay, are absolutely stable even if the floor is highly inclined. A floor conveyor is used to move the stillages outside the processing compartment, with its route freely selectable in the known way. In the interior of the processing compartment the stillages can on the one hand be moved easily by the skids and suitable roller tracks into the depth of the compartment and guided precisely sideways on the other. The stillages therefore need no steering into the processing compartment, similar to track-based systems. In contrast to the latter, however, a threshold can be arranged close to the door of the processing compartment. Individual stillages are moved in the processing compartment by the use of a mechanically simple and reliably operating special conveyor to be used both for moving the stillages in and out and ensuring that power is transmitted to the stillages at several points of the flexible conveyor, preventing local overloads.

The development of the invention is mechanically very simple and will operate at low friction between the tracking system and the stillages.

Based on a design of the tracking system even larger initial positional differences of the stillages may be corrected.

Based on a system of one embodiment, the sprocket of the flexible conveyor not equipped with drive dogs can be adjusted upwards for emergency operation, with the stillages moved manually or by a vehicle, a winch or similar equipment along the conveyor roller tracks. In a system 5 the engaging dogs of the continuous conveyor system and the stillages are contributing to the alignment of the stillages to their intended direction of movement.

The development of the invention according to another embodiment is of advantage in view of a smooth, jerk-free engagement between the drive dogs and driven dogs.

Arrangement of the driven dogs according to another embodiment ensures that essentially the same power transmission ratios exist for moving the stillages in and out. As the drive dog engages at the centre of the stillages, the risk of upsetting the stillages is small even if the stillages are only loaded with light-weight products.

In a system according to another embodiment the continuous conveyor can easily be set into a position in which the drive dog closest to the door is arranged under the floor area of the processing compartment to move the conveyor without risk of damage to the continuous conveyor underneath the front stillage.

A system according to another embodiment will ensure that the rest position mentioned of the foremost drive dogs will be brought about compulsorily and that part of the conveyor is moved through the door of the processing compartment.

The development of the invention according to a further embodiment is of advantage in view of the high load capacity and high torsional strength of the drive dogs (with reference to the vertical axis).

The development of the invention according to a further embodiment, too, is used to eliminate play in the continuous conveyor and to obtain a precise, robust, high-strength guide system for the conveyor chains.

In a system according to another embodiment the continuous conveyor may be positioned on a traditionally more or less continuous floor of the processing compartment. The construction of the floor can therefore remain unchanged, based on specific design criteria (i.e. easy cleaning, access, supply and discharge of liquid and gaseous media). Such a system may also be realised in a very simple way, based on existing processing compartments.

Figure 2:
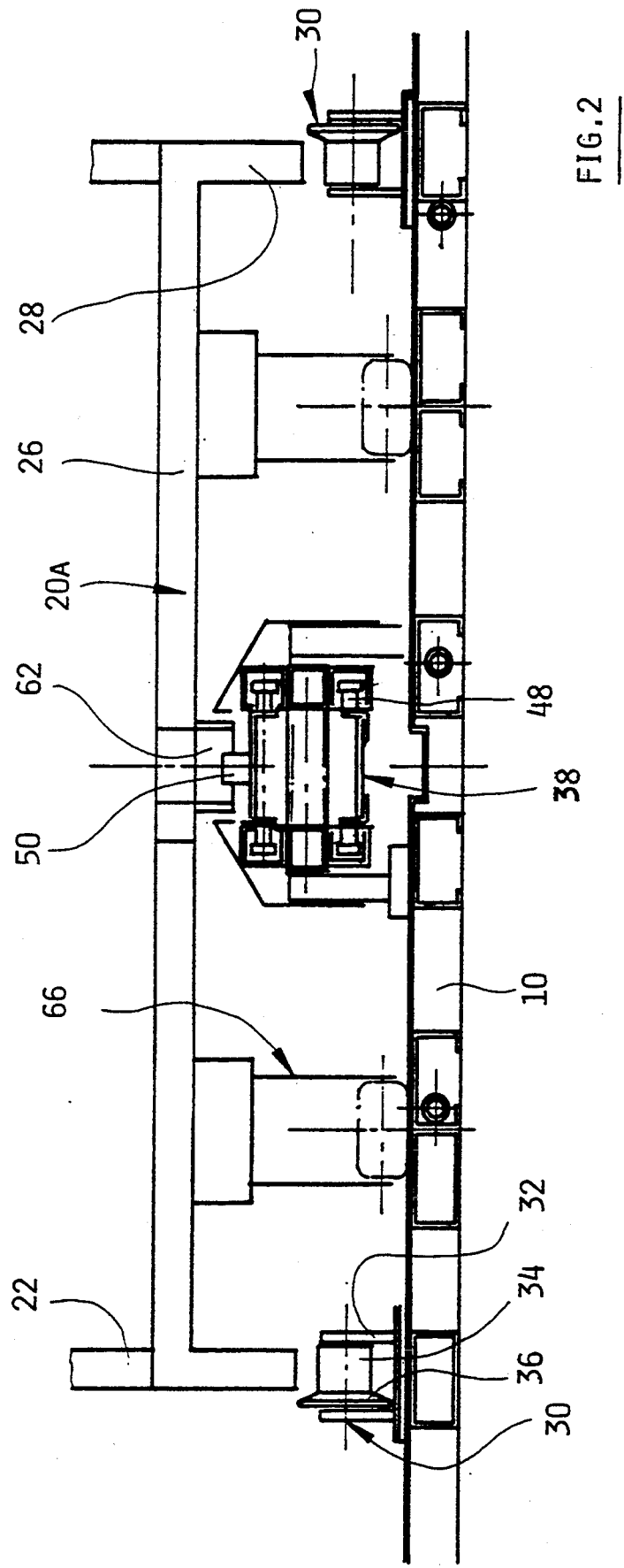
Figure 3:
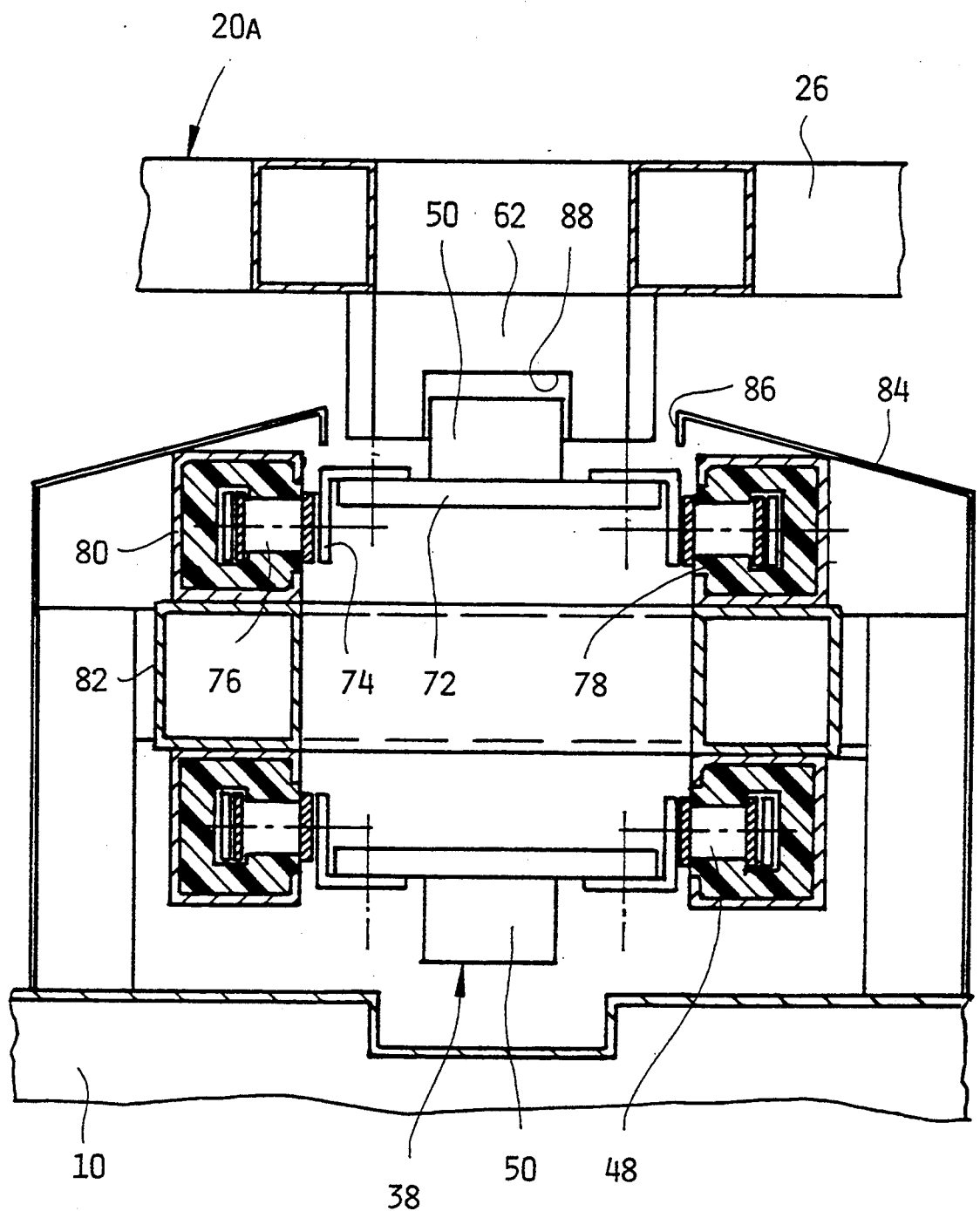

The following is a description of the invention by examples under reference to the drawings. These show the following:

FIG. 1: A longitudinal central section of the system for the smoking of cold meats and sausages;

FIG. 2: A transversal section through a practical example of a continuous conveyor of the system as per FIG. 1;

FIG. 3: An enlarged transversal section through a centralized chain conveyor of the processing system based on FIG. 2; and FIGS. 4 to 6: Various alternatives for drive dogs and driven dogs of the continuous conveyor and stillages of the system as per FIG. 1.

In FIG. 1, 10 is the floor of the factory in which smoked cold meat and sausage products are processed. The processing compartment 12 with a double-winged door 14 is arranged on the floor 10.

The ceiling of the processing compartment 12 includes a smoke gas generator 16 and a heating/cooling unit 18 including a motor and a venting system, with a flow connection to the interior of the processing compartment 12.

The interior of the processing compartment 12 includes three stillages 20 (20a, 20b, 20c in the sequence of entering), supporting the meat and sausage products on carriers not shown. Each stillage consists of vertical supports 22, horizontal longitudinal supports 24 and cross bracings 26 connected to form a rigid cage.

The bottom longitudinal supports 24 are each equipped with a skid 28. The skids are running on side roller tracks 30, each equipped with a support spar 32 and freely rotating rollers 4 which are pivotted in the same. Each of the rollers 34 has a wheel flange 36 including a conical face pointing in the direction of the system, as shown in FIG. 2.

A chain conveyor system, marked 38 is also arranged mirror-inverted to the central plane of the processing compartment 12 including two front 40 and two rear deflection rollers 42, connected by an axle 44 and/or 46 to prevent rotation. A roller chain 48 is guided over the deflection rollers, 40,42. This is connected over half its length with drive dogs 50 (a,b,c, depending on the shown position of a stillage) with a clearance x of larger than the length y of the stillages 20.

The deflection rollers 40 are driven by a chain drive 52 from an electric motor 54 arranged outside the processing compartment 12. This is energized by a control unit 56.

The control unit 56 is connected to a home position encoder arranged in the track of the drive dogs 50 at the height of the axle 44. In addition the control unit 56 is connected to a lifting truck detector 60 arranged close to the door of the processing compartment 12.

The central bottom cross supports 26 of the stillages 20 are each equipped with a drive dog 50 with a driven dog 62 protruding downwards into the track of the drive dogs 50 with a hard rubber pad 64 on its front and rear.

The drawing shows a schematic sketch of a lifting truck 66 to position or remove the stillages 20 to or from the section of the roller tracks 30 directly adjacent to the door 14.

The above system functions as follows:

Assuming initially that the processing compartment 12 is empty. As soon as the detector 60 is responding due to the approach of a stillage 20 by the lifting truck, the control unit 56 will control the electric motor 54 to move the roller chain 48 counter-clockwise until a drive dog 50 has reached the home position encoder 58. The output signal of the encoder will signal the control unit 56 to stop the electric motor 54. Now the lifting truck 66 may be moved together with the stillage 20 to the first position of the roller tracks 30 to position the stillage 20 there.

After the lifting truck 66 has been subsequently removed from the processing compartment 12, the output signal from the detector 60 is switched off and the control unit 56 will either control the electric motor 54 based on time or by radio (aerial 68) so that the stationary drive dog 50 next to the home position encoder will move to the driven dog 62 of the stillage 20 to be indexed thereafter by one division of the dog. Reaching of the second position on the roller tracks 30 may either be monitored by another position encoder, but an angle encoder 70 may be connected instead to the shaft of the electric motor 54 as shown in the example, also transmitting an output signal to the control unit 56.

The cycle described above will be repeated for the second and third stillage (and further stillages for processing compartments of greater lengths) as described for the above first stillage until the processing compartment 12 is completely full as shown in FIG. 1. Now the door 14 may be closed to start smoking.

After smoking and cooling of the products the door 14 is opened again, and the first drive dog 50 will be moved back to the home position encoder by triggering the detector 60. The lifting truck 66 may now move the first stillage 20 from the processing compartment 12. Subsequently (either controlled by a reduction in the signal level of the detector 60 or radio-controlled) the control unit 56 will be induced to move the electric motor 54 in anti-clockwise direction until the drive dog 50a has reached the rear working face of the driven dog 62b. This is followed by the stillage 20b being positioned close to the door 14 to be taken over by the lifting truck 66. Then the drive dog 50c will pull the stillage 20a by the driven dog 62 to the door 14 where it will be taken over by the lifting truck. To take over the stillage, the chain conveyor could possibly be moved by half a division in clockwise direction.

As shown in FIG. 3, the drive dogs 50 are positioned on transversal carriers 72 connected by brackets 74 to the links 76 of the two roller chains 48. The links 76 of the two roller chains 48 are engaging in synthetic track sections 78, consisting of a C-shaped section with an inside opening. The track sections 78 consist of a low-friction synthetic material. The track sections 78 are surrounded by C-shaped steel tracks 80. The chain guide for the return sprocket of the roller chains 48 is of analogue design. The steel tracks 80 together with a centralized steel box section 82 are forming the frame for the chain conveyor 38. All mechanical components of the chain conveyor are surrounded by an enclosure 84 with a longitudinal opening 86 at the top.

The drive dogs are engaging in the recesses 88 of the driven dogs 62 with the matching dogs contributing to the alignment of the stillages 20 to the intended direction of movement.

Figure 4:
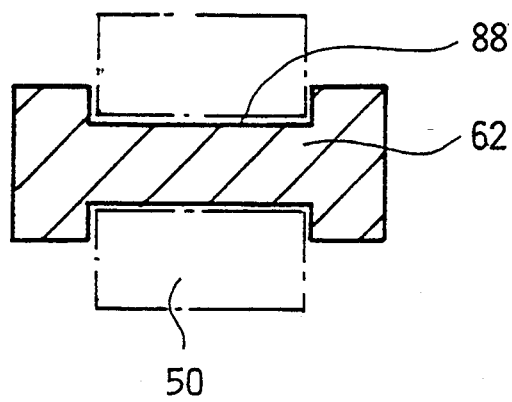

As shown in FIG. 4, the recesses 88 are arranged both on the front and rear of the driven dogs 62.

Figure 5:
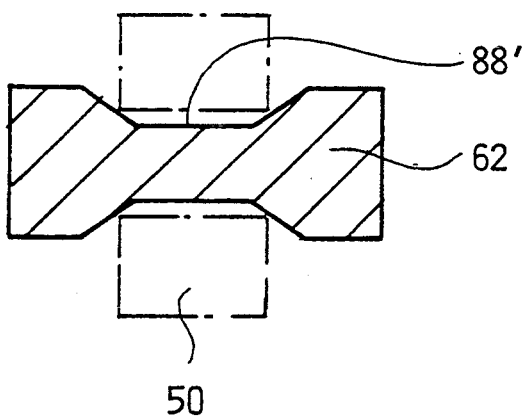
Figure 6:
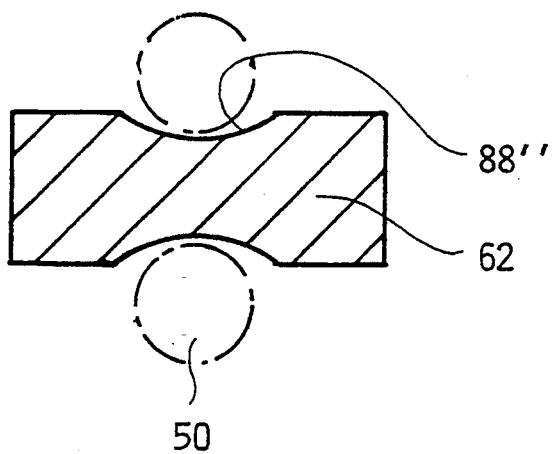

Instead of the recesses 88 of square sections, recesses with slanted side walls may be used as shown in FIG. 5, item 88'.

As another variation of the invention, cylindrical recesses 88" may be arranged in the driven dogs 62, with the drive dogs 50 being rod-shaped.

It is understood that the skids 28 do not necessarily have to be arranged at the bottom end of the stillages. They may also be arranged in the centre or at the top of the stillages, with the roller tracks 30 to be arranged appropriately higher in the processing compartment 12.

It is furthermore understood that the shown system may also be modified by arranging a second door at the rear end of the processing compartment for discharge from the rear of the compartment. The transfer cycles of this modified system correspond to those described above.

I claim:

1. System for the processing of products which comprises at least one processing compartment (12) having at least one door (14) which can be tightly closed, stillages (20) of predetermined longitudinal dimension (y) for the products to be processed, a conveyor system (38, 66) for moving the stillages (20) into and out of said processing compartment (12), said stillages (20) having two lateral skids (28); tracking means including spaced apart parallel roller tracks (30) including a succession of rollers (34) arranged in each processing compartment (12), said roller tracks (30) extending in the longitudinal direction of said processing compartment (12) and co-operating with said skids (28) of said stillages (20), said conveyor system including a mobile floor conveyor (66) that can move stillages (20) up to the entrance area of said processing compartment (12) and a conveyor (38) limited to the interior of said processing compartment (12), said conveyor (38) comprising at least one flexible conveyor means (48) which carries dogs (50) spaced by a distance (x) that is at least equal to said longitudinal dimension (y) of said stillages (20), a drive motor (54) for driving said flexible conveyor means (48), driven dogs (62) mounted on said stillages (20) protruding into the path of said drive dogs (50); a rest position encoder (58) provided adjacent the door (14) of said processing compartment (12) and in the region of a return roller (40) of said conveyor (38) located in the vicinity of the door (14) of said processing compartment (12), said encoder (58) responding to opposition of one of said drive dogs (50) when one of said drive dogs (50) reaches a position below the floor of said processing compartment (12), and a control unit (56) energizing said drive motor (54) that is actuated in accordance with an output signal from said rest position encoder (58).

2. A system as claimed in claim 1 wherein said tracking means includes wheel flanges (36) on the rollers (34) of said roller tracks (30).

3. A system as claimed in claim 2 wherein said wheel flanges (36) are conical.

4. A system as claimed in claim 1 wherein approximately half of said flexible conveyor (48) is equipped with drive dogs (50).

5. A system as claimed in claim 1 wherein said drive dogs (50) and said driven dogs (62) engage by means of positive aligning contact surfaces (50, 88).

6. A system as claimed in claim 1 wherein at least one of said dogs (50, 62) is equipped with flexible pads (64) on their working surfaces.

7. A system as claimed in claim 1 wherein said driven dogs (62) are arranged close to the center of said stillages (20).

8. A system as claimed in claim 7 wherein said control unit (56) cooperates with a detector (60) that responds to part of said floor conveyor (66) being in the door of said processing compartment (12).

9. A system as claimed in claim 1 wherein said flexible conveyor means (48) consists of two conveyor chains arranged with a clearance between them and that the drive dogs (50) are arranged on carriers (72) whose ends are each connected to one of said flexible conveyor means (48).

10. A system as set forth in claim 8 wherein detector (60) responds also to opposition of one of said stillages (20).

11. A system as claimed in claim 8 wherein at least working runs of the conveyor chains (48) are positively guided in low friction guide sections (78) supported by a conveyor frame (80, 82).

12. A system as claimed in claim 9 which includes deflectors (40, 42) for the conveyor chains (48) having a small diameter and said entire conveyor (38) is arranged level over the floor (10) of said processing compartment (12).

* * * * *